United States Patent [19]

Inoue et al.

[11] 3,754,914

[45] Aug. 28, 1973

[54] PHOTOSENSITIVE COMPOSITION CONTAINING AN ORGANIC HALOGEN COMPOUND PHOTOACTIVATOR, A COLOR MODIFIER AND A PHOTOREDUCIBLE ORGANIC METAL SALT AND THE USE THEREOF

[75] Inventors: Eiichi Inoue; Isamu Shimizu, both of Tokyo, Japan

[73] Assignee: Canon Kabushiki Kaisha, Tokyo, Japan

[22] Filed: July 24, 1969

[21] Appl. No.: 844,669

[30] Foreign Application Priority Data
July 29, 1968 Japan.............................. 53461/68

[52] U.S. Cl............... 96/48 R, 96/48 QP, 96/90 R, 96/90 PC, 96/89
[51] Int. Cl............................ G03c 5/24, G03c 1/52
[58] Field of Search............. 96/90 R, 90 PC, 89 R, 96/48 R, 48 QP

[56] References Cited
UNITED STATES PATENTS

| | | | |
|---|---|---|---|
| 3,231,381 | 1/1966 | Dickinson et al.................. | 96/90 X |
| 3,502,476 | 3/1970 | Itano et al............................... | 96/90 |
| 2,324,060 | 7/1943 | Boughton............................ | 96/90 X |
| 2,756,144 | 7/1956 | Ravich................................. | 96/90 X |
| 3,147,117 | 9/1964 | Wainer et al........................ | 96/90 X |

*Primary Examiner*—Norman G. Torchin
*Assistant Examiner*—Won H. Louie, Jr.
*Attorney*—Watson, Leavenworth, and Kelton

[57] ABSTRACT

A free radical is effectively produced from an organic halogen compound having at least one halogen atom in a medium comprising an organic metal salt capable of being reduced by applying radiation energy to at least the organic metal salt. This free radical producing method can be used for recording. A photosensitive composition and article of manufacture based on the above-mentioned components irradiated with such radiation energy is also disclosed.

10 Claims, No Drawings

PHOTOSENSITIVE COMPOSITION CONTAINING AN ORGANIC HALOGEN COMPOUND PHOTOACTIVATOR, A COLOR MODIFIER AND A PHOTOREDUCIBLE ORGANIC METAL SALT AND THE USE THEREOF

This invention relates to a process for producing free radicals from organic halogen compounds and a recording method using said process as well as a novel composition and article of manufacture.

It is well known that free radicals are formed by applying radiation energy to organic halogen compounds such as a polyhalogenated hydrocarbon. When sufficient radiation energy $h_2$ is applied to a polyhalogenated hydrocarbon ($CX_4$), free radicals, $CX_3\cdot$ and $X\cdot$, are formed as illustrated in the following formula:

$$CX_4 \xrightarrow{h\nu} CX_3\cdot + X\cdot \quad (1)$$

The resulting $CX_3\cdot$ is a chain carrier which causes a chain reaction whereby the free radical $X\cdot$ extracts hydrogen from a medium to cause a secondary dehydrogenating reaction and a halogen acid is formed as shown below.

$$X\cdot \xrightarrow{-H} HX \quad (2)$$

The chemical reaction as illustrated in formulas (1) and (2) is an example that a free radical is formed from an organic halogen compound. In general, free radicals and halogen acids formed from organic halogen compounds are often used for various chemical reactions and also for various recording systems.

Some examples of the recording methods employing free radicals are shown below.

1. Horizons Co. in the United State of America has developed free radical processes. Many patents for the process have been already published. The details are described in Photographic Science and Engineering, Vol. 5, No. 2, page 98 (1961); Vol. 8, No.2, page 91, 95 (1964). A representative free radical process comprises irradiating a system comprises arylamine and a polyhalogen compound with near ultraviolet light to form the print out dye image. When the original pattern is irradiated with near ultra-violet light, free radicals are produced from the polyhalogen compound and the resulting free radicals react with arylamine to form triphenylmethane dye and print out images are obtained. The above reaction proceeds in the following manner:

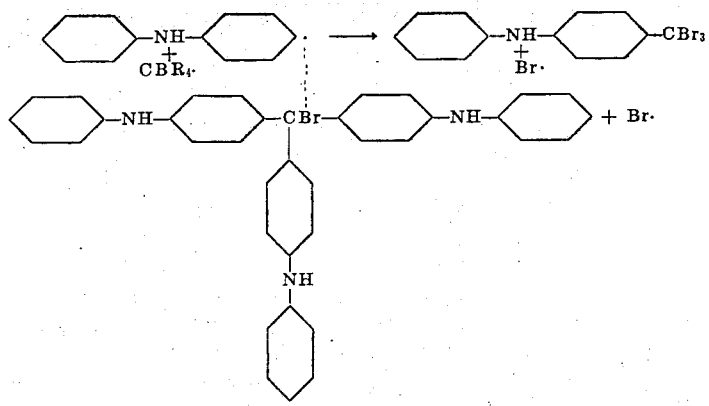

As a modification of the above process, various halogen compounds such as chlorides, iodides and bromides may be used and further, indoles, such as 3-methyl indole and the like may be optionally employed in place of the amine.

2. A free radical process used in the new heat developable photosystem developed by IBM in the United States of America. The details are reported in Photographic Science and Engineering, Vol. 8, No. 1, page 35 (1964). One of the representative process comprises using a light capable of decomposing carbon tetrabromide to produce secondarily a halogen acid. An original pattern is projected to a photosensitive member which comprises polymethyl isopropenyl ketone (PMIK) as a heat developable photographic material, carbon tetrabromide as a material capable of secondarily forming an acid by light, and triphenylmethan as a hydrogen donating material. A latent image is formed by the acid and then heated to cause the aldol condensation of PMIK in the presence of the halogen acid as a catalyst to form the polymer. The image is formed by this polymer. The fixing is effected by evaporating the remaining carbon tetrabromide by heating.

3. A free radical process is also employed in a photorecording process in which a photochromic material is utilized. According to the photochromic photorecording method, a photochromic material which is changed to a colored state having new absorption in the visible region by stimulating the intrinsic absorption region with ultraviolet light, is treated with an acidic compound to change the colored state, or the treatment with an acidic compound is effected to stabilize the colored state after the colored state is brought about by the ultraviolet ray. A representative example is as follows: A light capable of forming a halogen acid by the photodecomposition of the organic halogen compound is used to project the original pattern to a photosensitive member comprising mainly a spiropyran compound as a photochromic compound and an organic halogen compound producing a halogen acid secondarily by light. The resulting halogen acid converts the spiropyran compound to a colored state to produce colored images.

4. A free radical is further utilized in a recording method which comprises color-changing of acid-base indicator compounds. The photosensitive member therefor is mainly composed of a acid-base indicator and an organic halogen compound which can be decomposed by light to form secondarily a halogen acid, and the light is used to project an original pattern to the above-mentioned photosensitive member. Thus a halogen acid is formed to give rise to the color-change of the indicator compound to form an image.

As mentioned above, free radicals formed by irradiating organic halogen compounds with a radiation energy or halogen acids formed seconardily therefrom are used for simple reproduction processes which are not electrostatic system.

However, the conventional procedure for forming free radicals or secondarily a halogen acid does not efficiently give the free radical or halogen acid. For example, when the conventional free radical forming method is utilized in the recording processes (1) to (4) as mentioned above, a large amount of high energy should be employed for the purpose of producing sufficient free radicals from the organic halogen compound to obtain good images. Therefore, the good images can be obtained only by using a short wave length light such as ultraviolet light as the light source for imagewise exposure and exposing for a long time. Thus, the recording speed can not be improved and the lowered photosensitivity due to the low recording speed results in a impractical recording method.

Therefore, it is an object of this invention to provide a novel free radical forming method which can eliminate the disadvantages of the conventional free radical forming methods and can improve the efficiency of free radical formation novel compositions therefor and articles of manufacture obtained thereby.

It is a further object of this invention to provide a free radical forming method in which the free radical can be formed without directly applying a radiation energy to an organic halogen compound novel compositions therefor and articles of manufacture obtained thereby.

It is a further object of this invention to provide a free radical forming method by which free radicals can be produced by applying a radiation energy lower than that necessary to produce free radicals according to conventional methods novel composition therefor and articles of manufacture obtained thereby.

It is a further object of this invention to provide a highly sensitive photosensitive composition and article of manufacture which can be used for various recording methods.

The present inventors have now found that organic metal salts showing oxidative properties or reductive properties when exposed to a radiation energy can effectively act as a catalyst in the free radical forming method.

According to the process of this invention, free radicals can be produced by applying a radiation energy to organic halogen compounds, and more particularly, free radicals can be produced by applying a radiation energy such as light, radioactivity and the like to organic halogen compounds in the presence of organic metal salts having oxidative and reductive properties. In the present invention, the reason why the organic metal salt remarkably accelerates the formation of free radicals is not theoretically understood. Since the organic metal salt is reduced to a metallic ion or metal of lower valency by radiation energy, it is considered that the metallic ion or metal thus reduced acts as a initiator which catalytically forms free radicals from the organic halogen compound, and remarkably accelerates the reactions illustrated in formulas (1) and (2) to increase markedly the efficiency of generating the free radical. The oxidative and reductive property of organic metal salts by radiation energy differs depending upon the kind of organic metal salt. A representative example is illustrated by the following reduction reaction.

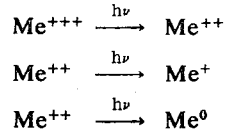

According to this invention, free radicals can be formed with high efficiency by applying radiation energy to the organic metal salt only without applying directly radiation energy to the organic halogen compound as well as by applying radiation energy to the organic metal salt together with the organic halogen compound. The latter manner of applying radiation energy can generate free radicals more efficiently than the former manner.

Organic metal salts usually have spectrum responses to radiation energy of a longer wave length than that required for organic halogen compunds, and thus a low radiation energy can be used for producing free radicals from organic halogen compounds. Therefore, this substantially results in optical sensitization. The organic halogen compound and organic metal salt of this invention are not only used for generating free radicals, but also can be used as fundamental components of a photosensitive material for recording methods in which image formation can be effected by using free radicals formed from organic halogen compound by a radiation energy or halogen acid formed secondarily therefrom as described in recording methods (1) to (4) above. The organic metal salt can be used as a fundamental component of a photosensitive material together with an organic halogen compound, an image forming material color or material properties of which are changed by a free radical formed from either the organic halogen compound or by a halogen compound produced secondarily from said free radical. By remarkably accelerating the formation of free radicals from the organic halogen compound, the color change or material property change can be caused in a short time. Here, the "color change" should be interpreted, in the broadest sense, as coloring, color eliminating, fading, discoloration and the like.

Further, the fundamental factors of this invention, that is, organic halogen compound and organic metal salt, constitute a photosensitive member together with the abovementioned image forming material. The photosensitive member thus constituted can be used for the recording methods (1) to (4) above. Further, since the organic metal salt can be a reaction initiator which catalytically produces free radicals from the organic halogen compund, this chemical property can give rise to other novel recording methods.

The halogen containing material useful in this invention may be represented by the following general formula:

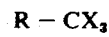

where R is hydrogen, halogen, alkyl, aralkyl or aryl (substituted or unsubstituted), and X may be, similar or dissimilar, selected from the group consisting of fluorine, chlorine, bromine, and iodine.

Some example of halogen containing compounds used for this invention are shown below:

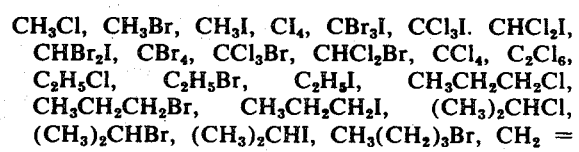

CHCl, $CH_2=CHBr$, $CH_2=CHCH_2Cl$, $CH_2=CHCH_2Br$, and $CH_2=CHCH_2I$.

Other than the above-mentioned halogenated hydrocarbons, aromatic compounds having a halogen substituent may be widely used in this invention.

Some examples of the metal salt used in this invention are those which can be reduced to a metal ion or metal of lower valency by irradiation with radiation energy are shown below:

1. Oxalates:
   iron potassium oxalate, uranylammonium oxalate, uranylpotassium oxalate, uranium potassium oxalate, potassium oxalate, cobalt oxalate, cobalt potassium oxalate and the like.
2. Acetates (A metal atom is shown by "M" in the following.):
   a. Monovalenty salts represented by $M^I(CH_3COO)$ where M is Na, K, Rb, Sn, Ag, Hg and the like.
   b. Divalenty salts represented by $M^{II}(CH_3COO)_2$ where M is Be, Mg, Ca, Sr, Ba, Zn, Cd, Hg, Sn, Pb, Cu and the like.
   c. Trivalenty salts represented by $M^{III}(CH_3COO)_3$ where M is Al, Ga, Tl, As, Bi, Co, Ni, In Fe and the like.
   d. Tetravelenty salts represented by $M^{IV}(CH_3COO)_4$ where M is Si, Sn, Pb, and the like.
3. Basic salts: $Cu(OH)_2(CH_3COO)_4$ and the like.
4. Metal complex salts:
Metal dithizones represented by the formula

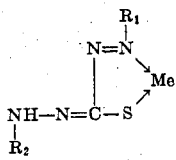

where $R_1$ and $R_2$ are selected from the group consisting of hydrogen, alkyl, aralkyl, and aryl; Me is a metal atom such as $Cu^{II}$, $Zn^{II}$, $Pb^{II}$, $Co^{II}$, $Fe^{II}$, $Hg^{II}$, $Ni^{II}$, $Zn^{II}$, $Sn^{II}$ and the like.

Solvents which can be used in this invention, are, for example, water, benzene, toluene, xylene, cyclohexane, n-hexane, butyl alcohol, ethyl alcohol, methyl alcohol, isopropyl alcohol, n-propylalcohol, dimethylformamide, acetone, ethyl acetate, pyridine, trichlene, and quinoline. Further, homologs of the above-mentioned materials also may be used.

If desired, the halogen free radical forming means according to this invention may be provided in a chemically inert carrier, for example, a resinous carrier. The carrier may be a thin film or layer which may be supported on a self-supporting material. Further, in a particular case, a self-supporting film may be used. In addition, a resinous chemically inert material can be optionally added to the composition.

As the resinuous chemically inert materials used in this invention, there may be mentioned, for example, gelatin, polyvinyl alcohol, carboxymethyl cellulose, polyvinyl pyrrolidone, polymethyl methacrylate, ethyl cellulose, nitrocellulose, methyl cellulose, cellulose acetate, polyvinyl chloride, polystyrene, polyvinyl acetate, cellulose acetate polymer, cellulose propionate polymer, cellulose acetate propionate, carbonate polymer, acrylonitrile polymer, polyamide, polymethylstyrene, polystyrenebutadiene, polyvinylacetal, polyvinylbutyral, paraffine, and wax.

The free radical producing method according to this invention can be applied to a material which color and properties are change by the free radical or halogen acid formed secondarily. Thus, various photosenstive materials and recording methods are provided by this invention.

1. Materials for the free radical type of recording method include, for example, arylamines such as diphenylamine, p-aminodiphenylamine, p-aminophenol, N-methyl diphenylamine, m-anilinophenol, p-phenylazodiphenylamine, di-p-anilinophenol, p-phenylazodiphenylamine, di-p-tolylamine, carbazole, N,N-dimethylaniline, N,N-dimethylaniline hydrochloride, N-n-butylaniline, 2-anilinaethanol, N-phenylylsine, N-phenylglycine ethyl ester, triphenylamine, and indoles such as 2-methylindole, 1,2-dimethyl-indole, and 3-methylindole.

2. Materials for the recording method comprising the new heat-developable photosystem as mentioned above, include for example, a compound of the formula

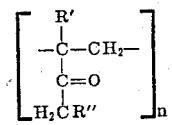

where R' and R'' are aliphatic or aromatic groups and further may be hydrogen or halogen. Representative compounds of the above formula are polymethyl isopropenyl ketone (PMIK), methyl vinylketone, α-chlorovinylmethyl ketone and the like.

3. Spiropyran compounds include compounds represented by the formula:

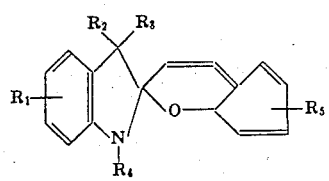

where $R_2$ and $R_3$ may be $-CH_3$, $R_4$ may be $-CH_3$ or $-C_6H_5$, and $R_5$ may be 6'-$NO_2$, 6'-$NO_2$-8'-$OCH_3$, 6'-OH, 7'-OH, 8'-OH, 6'-COOH, 7'-COOY, 8'-COOH, 6'-$NO_2$-8'-F, 6',8'-diBr, 6'-$OCH_3$-8'-$NO_2$, or 5'-$NO_2$-8'-$OCH_3$. In addition, the indolenine derivatives, pyran derivatives, thiazole derivatives and oxazole derivatives may be used.

4. Acid-base indicators include preferably alizarin yellow, bromocresol purple, bromthymol blue, methyl orange, methyl red, α-naphthol phthalein, neutral red, phenol red, phenolphthalein, thymol blue, dimethylamino azobenzene, benzalacetophenone, and 4-phenylazodiphenylamine.

According to the process for producing free radicals, organic halogen compound in combination with organic metal salts may be irradiated with a radiation energy. According to this treating method, free radicals can be produced in a yield of about 10 to 20 times that by a conventional free radical generating method wherein no organic metal salt is employed. According to another embodiment of this invention, it is possible to produce free radicals in good yield by applying a radiation energy to the organic metal salt with an amount of energy sufficient to reduce the organic metal. In other words, after applying a radiation energy to the organic metal salt, the organic metal salt is mixed with the organic halogen compound to produce free radicals, or after applying a radiation energy to a single system of the organic metal salt and a system comprising a combination of the organic halogen compound and the organic metal compound, these two systems are mixed to accelerate the formation of free radicals.

When the free radical producing method of this invention is applied to prepare a photosensitive material for various recording methods, the photosensitive material is composed of mainly an organic halogen compound, an organic metal salt and a material susceptible to color change or material change caused by a free radical or a halogen acid secondarily formed from the free radical. The above-mentioned materials may be used as said material subjected to color change or material change caused by a free radical or a halogen acid. The photosensitive material thus prepared is found to have high photosensitivity.

Further, when the free radical producing method of this invention is used as a novel recording method, a photosensitive layer composed of mainly the organic halogen compound, the organic metal salt and the above-mentioned material susceptible to color change or material change is imagewise-exposed by using a radiation energy sufficient to reduce at least the organic metal salt to form the image. Another embodiment of such recording method is one where a photosensitive layer is composed of fundamentally the organic metal salt and the organic metal salt is imagewise-exposed by a radiation sufficient to reduce at least the organic metal salt after which the surface of the photosensitive layer thus exposed is immediately treated with a material susceptible to color change or material change to form the image. In a further embodiment of the above-mentioned recording method, the surface of photosensitive layer composed of fundamentally the organic halogen compound and the organic metal salt is treated with the material susceptible to color change or material change and then immediately an imagewise exposure is effected by using a radiation energy sufficient to reduce at least the organic metal salt to form the image. In the above embodiment, when the surface of the photosensitive layer is treated with a material susceptible to color change or material change, said susceptible material may be applied by a coating or spraying method, and further, if desired, such surface treatment may be applied according to the pattern so as to control the formation of the image at portions other than the pattern portion. Furthermore, when the surface of the photosensitive layer is treated with the material susceptible to color change or material change, the treatment is effected so as to form the image at the region which is treated with the susceptible material and thus, in the subsequent step, the image can be formed by a whole surface exposure in place of the imagewise exposure.

Some of the foregoing embodiments of the invention are given below more in detail.

1. A layer containing mainly an organic metal salt is formed and imagewise-exposed, and then treated with a treating material composed of mainly an organic halogen compound and an image forming material to form the image.

2. A layer containing mainly an organic metal salt is prepared, and the whole surface is exposed and treated with a treating material composed of mainly an organic halogen compound and an image forming material so as to form the image at the treated area. Thus, an image corresponding to the treated area is formed.

3. A layer containing mainly an organic metal salt is prepared, treated with a treating material composed of mainly an organic halogen compound and an image forming material, and imagewise exposed to form the image.

4. A layer containing mainly an organic metal salt is prepared, treated with a treating material composed of mainly an organic halogen compound and an image forming material so as to form the image at the treated area and then whole surface exposure is applied thereto to produce the image at the treated area as above.

5. A layer containing mainly an organic halogen compound and an organic metal salt is prepared, imagewise exposed, and treated with a treating material composed of mainly an image forming material to form the image.

6. A layer containing mainly an organic halogen compound and an organic metal salt is treated with a treating material composed of mainly an image forming material so as to form the image at the treated area. Thus, an image is obtained in accordance with said treated area.

7. A layer containing mainly an organic halogen compound and an organic metal salt is treated with a treating material composed mainly of an image forming material and imagewise-exposed to obtain the image.

8. A layer containing mainly an organic halogen compound and an organic metal salt is prepared is treated with a treating material composed mainly of an image forming material so as to form the image at the treated region. Thus an image according to the treated area is formed.

9. A layer containing mainly an organic metal salt and an image forming material is prepared, imagewise exposed, and treated with a treating material composed of mainly an organic halogen compound.

10. A layer containing mainly an organic metal salt and an image forming material is subjected to whole surface exposure, and treated with a treating material composed of mainly an organic halogen compound so as to form the image at the treated region and thus the image according to the treated area is obtained.

11. A layer containing mainly an organic metal salt and an image forming material is prepared, treated with a treating material composed of mainly an organic halogen material, and imagewise exposed to form the image.

12. A layer containing mainly an organic metal salt and an image forming material is prepared, treated with a treating material composed of mainly an organic halogen compound in such a manner that the image is to be formed at the treated region, and subjected to whole surface exposure to produce the image in accordance with the treated region.

13. A layer containing mainly an image forming material is prepared, treated with a treating material composed of mainly an organic halogen compound and an organic metal salt in such a manner that the image is to be formed at the treated region, and subjected to whole surface exposure to form the image in accordance with the treated region.

14. A treating material containing mainly an organic halogen compound and an organic metal salt is irradiated with a radiation to obtain a treating material, and then the treating material thus irradiated is applied to a surface of a layer composed of mainly an image forming material so as to form the image in accordance with the treated region, and thus the image is produced.

15. A layer containing mainly an image forming material is formed, treated with a treating material composed of mainly an organic halogen compound and an organic metal salt, and imagewise exposed to form the image.

16. A layer containing mainly an organic halogen compound, and then treated with a treating material composed of mainly an organic metal salt and an image forming material which are irradiated by radiation, so as to form the image in accordance with the treated region, and thus the image is formed.

17. A treating material containing mainly an organic metal salt is irradiated with radiation, and the treating material thus irradiated is applied to a layer composed of mainly an organic halogen compound and an image forming material to form the image at the treated region, and thus the image is formed in accordance with the treated region.

In the above, each layer in items (1) to (17) is generally formed on a support, but may be self-supporting. The radiation used for exposure or irradiation in items (1) to (17) should be that capable of reducing at least the organic metal salt, and may be preferably that capable of causing photolysis of the organic halogen compound to form free radicals in addition to the reduction of the organic metal salt.

The following examples are given for illustrating this invention, but not for limiting this invention.

Example 1

Copper acetate—0.05 g.
Acetic acid—3 ml.
Ascorbic acid—0.05 g.

The first composition composed of the above mentioned components is thoroughly mixed and dissolved and the resulting composition is irradiated by ultraviolet light having wave lengths of 365 m$\mu$ and 313m$\mu$ obtained by a super high pressure 250 W mercury lamp (manufactureed by Ushio Denki) with a glass filter uvD25 (trade name, supplied by Toshiba) at a distance of 10cm. for 10 seconds.

The first composition thus irradiated is added to a second composition composed of paraphenylenediamine 0.1 g. and carbon tetrachloride 2 ml reacted in the dark and a white precipitate is formed without light irradiation. The amount of white precipitate thus formed is about 10 times that obtained by irradiating only the second composition without irradiating the first composition. The above-mentioned parapheny-lene-diamine is reacted with a free radical formed from carbon tetrachloride to produce a white dye and the amount of white precipitate produced according to the above procedure is almost in proportion to the amount of free radicals formed from carbon tetrachloride. Therefore, when the free radical is formed by using copper acetate as the organic metal salt, the free radical can be produced from carbon tetrachloride as an organic halogen compound in the yield of about 10 times. Further, in the present Example, a layer composed of mainly the abovementioned second composition is formed firstly and then the first composition irradiated by light is applied to the abovementioned layer in such a manner that the image is formed at the treated region.

Example 2

A mixture system composed of the first composition and the second composition used in Example 1 is irradiated with the same light source at the same irradiation conditions as in Example 1 for 10 seconds. Thus, there is obtained a white precipitate of about 15 times that obtained by irradiating only the second composition in the absence of the first composition.

Example 3

Copper acetate—0.03 g.
Acetic acid—2 ml.
Ascorbic acid—0.03 g.

The above-mentioned components are thoroughly mixed and dissolved. To the resulting mixture, a solution of paraphenylenediamine 0.1 g. and carbon tetrachloride 2 ml. is added to form the first composition after which the following components are thoroughly mixed and dissolved to form the second composition:

copper acetate—0.02 g.
acetic acid—2 ml.
ascorbic acid—0.02 g.

The first composition and the second composition are separately irradiated by the same light source at the same conditions as in Example 1 for 10 seconds, mixed and allowed to stand in a dark place to form a white precipitate. The amount of white precipitate is about 14 times that obtained by irradiating only a system containing paraphenylenediamine and carbon tetrachloride which does not contain copper acetate at all.

Example 4

I. Potassium trioxalate ferrate—0.05 g.
   Water—1 ml.
II. Carbon bromide—0.08 g.
    Ethyl alcohol—2 ml.

The composition I and the composition II are separately and thoroughly mixed after which both compositions are with one another mixed. The resulting mixture is irradiated by ultraviolet light obtained from a 500W. super high pressure mercury lamp (manufactured by Ushio Denki) with a glass filter uvD25 (supplied by Toshiba) at a distance of 10cm. for 5 seconds. The mixture thus irradiated is added to and reacted in the dark with a third composition (III below):

III. 1,3,3-Trimethylindolino-6'-hydroxybenzopyrryl-
     spiran—0.01 mg.
     Ethyl alcohol—10 ml.

and the red solution initially obtained is changed to a yellow product.

The efficiency of the conversion to the yellow product is determined by light absorption analysis using a Shimazu MPS-50 Autorecording Spectrophotometer. The efficency is about seven to eight times that in case of only irradiating the mixture of the second composition and the third composition with ultraviolet light. In a manner similar to Example 2, a similar result is obtained by irradiating the first, the second and the third compositions. The color of the above-mentioned spiran compound (III above) is change by the halogen acid secondarily formed from the halogen free radical produced from carbon tetrabromide. The degree of color change reflects the amount of the halogen acid produced and at the same time the amount of the halogen free radical produced. In Example 1, after forming a layer composed of mainly the third composition, the surface is treated with a treating material composed of the first and the second composition followed by imagewise irradiation to form a yellow image of high fidelity to the original image. Further, after irradiating the treating material with a radiation by using the above-mentioned high pressure mercury lamp, an aluminum foil having void portions corresponding to an original pattern is intimately contacted with the above-mentioned surface layer and then treated with the above-mentioned treating material through the aluminum foil to form yellow image faithful to the original image.

Example 5

I. Diphenylthiocarbazone ($C_6H_5NHNHCSN : NC_6H_5$)—0.51 g. Carbon disulfide—10 ml.

II. Nickel sulfate—0.80 g. Water—10 ml.

The compositions I and II are separately and thoroughly mixed and then the resulting compositions are mixed together and sufficiently shaken to form a nickel dithizone complex. The complex is irradiated by light from a 250 W. super high pressure mercury lamp (manufactured by Ushio Denki) to which the following composition (III) is added and reacted in the dark:

III. Carbon tetrabromide—0.05 g. Ethyl alcohol—10 ml. Paradiphenylamine—0.1 g.

A greyish precipitate is formed.

The efficiency of precipitate formation is far higher than that in case of irradiating only the composition (III).

Example 6

Tin acetate—0.05 g.
Acetic acid—3 ml.
Accorbic acid—0.05 g.

The above-mentioned components are thoroughly mixed and dissolved, and irradiated with ultraviolet having a wave length of 365 m$\mu$ and 313 m$\mu$ obtained from a 250 W. super high pressure mercury lamp (manufactured by Ushio Denki) with glass filter uvD25 (supplied by Toshiba) at a distance of 10 cm. for 10 seconds.

The first composition as above thus irradiated is added to and reacted in the dark with the second composition:

paraphenylenediamine—0.1 g.
carbon tetrachloride—2 ml.

to form a white precipitate without further irradiation. The amount of the resulting white precipitate is about 10 times where obtained in case that only the second composition is irradiated in the absence of the first composition.

Example 7

I. Uranyl oxalate—0.05 g.
Water—1 ml.

II. Carbon tetrabromide—0.08 g.
Ethyl alcohol—2 ml.

A mixture of compositions I and II above are irradiated with ultraviolet light obtained from a 500W. super high pressure mercury lamp (manufactured by Ushio Denki) with a glass filter uvD25 (supplied by Toshiba) at a distance of 10 cm. for 5 seconds.

The composition thus irradiated is added to and reacted in the dark with the following composition (III):

III. 1,3,3-trimethylspiro-8'-hydroxy (2,2'-benzopyran)—0.01 mg.
Ethyl alcohol—10 m .

and thereby the red solution is changed to yellow.

The yellow change efficiency is determined by Shimazu MPS-50 Autorecording Spectrophotometer and it is found that the efficiency is seven to eight times that in case of projecting ultraviolet light to only the mixture of the compositions II and III.

When a mixture system of compositions I, II and III is irradiated in a similar manner to Example 2, a similar result is obtained.

Example 8

Polyvinylbutyral (S-lec BLS, trade name, supplied by Sekisui Kaguku)—50 parts by weight
Ethyl alcohol—250 parts by weight The above components are heated to about 50° C and agitated to form a high polymer binder solution (Composition I). Potassium trioxalate ferrate (500 mg.) is added to 10ml. of ethyl alcohol, stirred with a supersonic agitator for 3 hours to produce a uniform dispersion (Composition II) as an organic metal salt dispersion. To 20 g. of the Composition I is added 700 mg. of carbon tetrabromide and 600 mg. of diphenylamine, stirred thoroughly, and then the Composition II is added thereto followed by stirring with the supersonic agitator to obtain a uniform dispersion. The photosensitive material thus obtained is uniformly applied onto a transparent cellulose acetate film and dried naturally in a dark place to produce a photosensitive film of 30$\mu$ in thickness. The photosensitive film is intimately contacted with a negative film original and irradiated with an exposure device having a 500W super high pressure mercury lamp at a distance of 25 cm. for one second and then irradiated with infrared radiation at 95° – 100° C for 30 min. to accelerate the coloring reaction by the heating. Thus, a blue colored image faithful to the original is obtained.

On the contrary, when a photosensitive film is prepared by using the same photosensitive material as above excluding potassium trioxalate ferrate, exposure of about 10 seconds is necessary to obtained a colored image faithful to the original under the same exposing conditions as above.

Example 9

1,3,3-Trimethylindoline-6'-hydroxybenzopyrryl-spiran—500 mg.
Carbon tetrabromide—650 mg.

The above-mentioned components are added to a 20% dioxane solution of ethyl cellulose (20 g.) and stirred sufficiently to obtain a mixture (Composition I). Potassium trioxalate ferrate (500 mg.) is added to 10 ml. of ethyl alcohol dispersed and stirred for 3 hours with a supersonic agitator and thus a mixture (Composition II) is obtained. The Composition II is then mixed with Composition I, dispersed uniformly by a supersonic agitator, applied at a thickness of 50$\mu$ to a stainless steel plated with chromium, and dried naturally in a dark place to obtain a photosensitive plage having a red photosensitive surface. Then, a negative image film is intimately contacted with the photosensitive surface of the photosensitive plate, and the original image is irradiated by an exposure device which has a 500W super high pressure mercury lamp as the light source at a distance of 20 cm. for about 10 sec. to obtain a yellow image faithful to the original.

On the contrary, when a photosensitive plate prepared in a similar manner to the above excluding potassium trioxalate ferrate is used, exposure for about 40 seconds is necessary to obtain a colored image faithful to the original under the same conditions as above.

Example 10

Polyvinylbutyral resin (S-lec BS, trade name, supplied by Sekisui Kagaku)—50 parts by weight
Ethyl alcohol—250 parts by weight The above components are heated to about 50° C and stirred to obtain a high polymer solution for binder. Potassium trioxalate ferrate (500 mg.) is added to 10 ml. of ethyl alcohol, stirred for about 3 hours with a supersonic agitator and dispersed uniformly to obtain a dispersion liquid of the organic metal salt. The dispersion liquid thus obtained is mixed with 20 g. of the high polymer solution and stirred thoroughly with the supersonic agitator and dispersed uniformly to obtain a liquid mixture.

The liquid mixture thus prepared is applied to a cellulose acetate film with a wire-bar to form a uniform coating of about 30 $\mu$ thick. Thus, a film having an organic metal salt on the surface is formed. A negative original image is projected to the surface having the organic metal salt by using a 500 W superhigh pressure memory lamp at a distance of 25 cm. for about 10 seconds, and then the film surface is rapidly treated with 10 ml. of benzene solution containing 700 mg. of carbon tetrabromide and 60 mg. of diphenylamine. Further, the film surface is irradiated with an infrared lamp at 95° to 100° C. for about 40 seconds to accelerate the coloring reaction by heat. Thus, a blue colored negative image faithful to the original is produced.

Alternatively, before projecting the negative image, the above-mentioned film having the organic metal salt on the surface is treated with a benzene solution of carbon tetrabromide and diphenylamine, and then the negative original image is projected. Thus, a blue colored positive image faithful to the original image is obtained in a manner similar to the above procedure.

Further, after the above-mentioned film having an organic melt salt on the surface is subjected to whole surface irradiation by the projection device as used above at a distance of 25 cm. for about 10 seconds, the film surface is rapidly treated with a benzene solution of carbon tetrabromide and diphenylamine in such a manner that image is formed at the region treated with the benzene solution. Thus, a clear blue colored image is obtained according to the region treated by the benzene solution.

Further, alternatively, before the film having an organic melt salt on the surface is subjected to whole surface irradiation, the film is treated with a benzene solution of carbon tetrabromide and diphenylamine in such a manner that image is formed at the region treated by the benzene solution. Then, the whole surface irradiation results in the formation of clear blue colored image according to the region treated by the benzene solution.

Example 11

Lead-diphenylthiocarbazone complex (lead dithizone) is dispersed and dissolved in xylene to form a 2% (by weight) solution of lead dithizone. To 20 ml. of the 2% solution are added 500 mg. of iodoform, 100 mg. of methyl red and 2g. of polystyrene (Picolastic D-100, trade name, supplied by ESSO) and mixed sufficiently to form a solution. The resulting solution is spread over a glass palte to form a film-like photosensitive plate of 55$\mu$ thick. A negative original is projected to the photosensitive plate by a 500W xenon lamp at a distance of 25 cm for about 60 seconds to produce a red colored image.

Example 12

Lead-diphenylthiocarbazone complex (lead dithizone) is dispersed and dissolved in xylene to form a 2% (by weight) solution of lead dithizone. To 18 ml. of the resulting solution are added 100 mg. of methylred and 2 g. of polystyrene (P iccolastic D-100, trade name, supplied by ESSO) and mixed sufficiently to form a solution. The resulting solution is spread over the surface of a glass plate to form a photosensitive plate of 50$\mu$ thick having the organic metal salt and the image forming color change material (methyl red) on the surface. The surface of the glass plate is treated with 5 ml. of an ethyl alcohol solution containing 500 mg. of iodoform, and a negative original image is projected to the surface thus treated by using a 500 W. xenon lamp at a distance of 25 cm. for about 90 seconds to obtain a red positive image faithful to the original.

Alternatively, after projecting a negative original image, the surface of the glass plate as above having the organic metal salt and the image forming color change material is treated with the above-mentioned benzene solution of iodoform to form a red colored positive image faithful to the original in a similar manner to the above procedure.

Alternatively, the surfaces of a glass plate having the above-mentioned organic metal salt and image forming color change material is subjected to whole surface irradiation at a distance of 25 cm. for 95 seconds and then treated rapidly with the above-mentioned ethyl alcohol solution of iodoform in such a manner that the region treated with the above-mentioned ethyl alcohol solution forms the image. Thus, a clear red image is obtained in accordance with the region treated with the above-mentioned ethyl alcohol.

In addition, before the above-mentioned glass plate having the organic metal salt and the image forming color change material on the surface is subjected to whole surface irradiation, the surface is treated in such a manner that the region treated with the ethyl alcohol solution forms the image. Then, the surface is subjected to whole surface irradiation and thus a clear red image is obtained in accordance with the region treated with the ethyl alcohol solution.

Example 13

Carbon tetrabromide—500 mg.
Polystyrene (Picolastic D-100, trade name, supplied by E S S O)—2 g.

The above components are dissolved in 20 ml. of xylene, and 500 mg. of cobalt potassium oxalate is added thereto and thoroughly dispersed therein by using a supersonic agitator to form a liquid dispersion. The liquid dispersion thus obtained is applied to a two-sided paper of about 80$\mu$ thick to produce a coating containing the organic halogen compound, i.e., carbon tetrabromide, and the organic metal salt, cobalt potassium oxalate. The coated art paper thus produced is irradiated with a 500 W. superhigh pressure mercury lamp through the negative original at a distance of 25cm. for 60 seconds and then treated rapidly with 10 ml. of an ethyl alcohol solution containing 100 mg. of dimethyl yellow to form a red colored positive image faithful to the original.

Alternatively, the above-mentioned art paper having the organic halogen compound and the organic metal salt is firstly treated with the above-mentioned ethyl alcohol solution of dimethyl yellow and the negative image is projected thereto. Thus, a positive image of fidelity to the original is obtained in a similar manner.

Further, the above-mentioned coated art paper is subjected to whole surface irradiation by the above-mentioned lamp at a distance of 25 cm. for about 80 seconds, and then treated rapidly with the above-mentioned ethyl alcohol solution of dimethyl yellow in such a manner that the region treated with the ethyl alcohol solution forms an image. Thus, a clear red colored image is obtained in accordance with the ragion treated with the ethyl alcohol solution.

In addition, before the above-mentioned coated art paper is subjected to whole surface irradiation, the coated art paper is treated in such a manner that the region treated with the ethyl alcohol solution of dimethyl yellow forms the image, and is then subjected to whole surface irradiation. Thus, a clear colored image is obtained in accordance with the region treated with the ethyl alcohol solution.

What is claimed is:

1. A photosensitive material which comprises a mixture of an organic halogen compound having at least one halogen atom, an organic metal salt which can be reduced by radiation energy selected from the group consisting of metal oxalates, metal acetates, $Cu(OH)_2(CH_3COO)_4$ and metal dithizones, of the formula

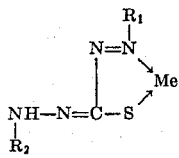

where $R_1$ and $R_2$ are selected from the group consisting of hydrogen, alkyl, aralkyl, and aryl; Me is a metal atom selected from the group consisting of $Cu^{II}$, $Zn^{II}$, $Pb^{II}$, $Co^{II}$, $Fe^{II}$, $Hg^{II}$, $Ni^{II}$, $Zn^{II}$, $Sn^{II}$, and an image forming material capable of forming an image by the reaction with one member of the group consisting of a free radical produced from said organic halogen compound and a halogen acid secondarily formed from said free radical, said image forming material being subjected to a color change, said image forming material being selected from the group consisting of arylamines, indoles, spiropyran compounds and acid-base indicators.

2. A method of recording which comprises forming an image by imagewise exposing, with radiation capable of reducing an organic metal salt, a photosensitive material comprising an organic halogen compound having at least one halogen atom, an organic metal salt which can be reduced by radiation energy selected from the group consisting of metal oxalates, metal acetates, $Cu(OH)_2(CH_3COO)_4$ and metal dithizones of the formula

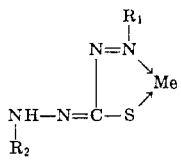

where $R_1$ and $R_2$ are selected from the group consisting of hydrogen, alkyl, aralkyl, anr aryl; Me is a metal atom selected from the group consisting of $Cu^{II}$, $Zn^{II}$, $Pb^{II}$, $Co^{II}$, $Fe^{II}$, $Hg^{II}$, $Ni^{II}$, $Zn^{II}$, $Sn^{II}$, and an image forming material capable of forming an image by the reaction with one member of the group consisting of a free radical produced from said organic halogen compound and a halogen acid secondarily formed from said free radical, said image forming material being subjected to a color change, said image forming material being selected from the group consisting of arylamines, indoles, spiropyran compounds and acid-base indicators.

3. A method of recording which comprises employing a treating material composed mainly of an organic halogen compound having at least one halogen atom and an image forming material selected from the group consisting of arylamines, indoles, spiropyran compounds and acid-base indicators capable of forming an image by color change caused by reaction with at least one member of the group consisting of a free radical produced from said organic halogen compound and a halogen acid secondarily formed from said free radical, and a photosensitive member containing mainly an organic metal salt which can be reduced by a radiation energy selected from the group consistng of metal oxalates, metal acetates, $Cu(OH)_2(CH_3COO)_4$ and metal dithizones of the formula

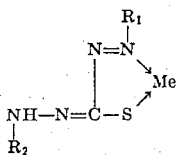

where $R_1$ and $R_2$ are selected from the group consisting of hydrogen, alkyl, aralkyl, and aryl; Me is a metal atom selected from the group consisting of $Cu^{II}$, $Zn^{II}$, $Pb^{II}$, $Co^{II}$, $Fe^{II}$, $Hg^{II}$, $Ni^{II}$, $Zn^{II}$, $Sn^{II}$, said photosensitive member being imagewise exposed by said radiation energy and then the surface of said photosensitive member is treated with said treating material to form an image.

4. A method of recording which comprises employing a treating material composed mainly of an organic halogen compound having at least one halogen atom and an image forming material selected from the group consisting of arylamines, indoles, spiropyran compounds and acid-base indicators capable of forming an image by color change caused by reaction with at least one member of the group consisting of a free radical produced from said organic halogen compound and a halogen acid secondarily formed from said free radical, and a photosensitive member containing mainly an organic metal salt which can be reduced by a radiation energy selected from the group consisting of metal oxalates, metal acetates, $Cu(OH)_2(CH_3COO)_4$ and metal dithizones of the formula

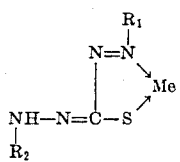

where $R_1$ and $R_2$ are selected from the group consisting of hydrogen, alkyl, aralkykl and aryl; Me is a metal atom selected from the group consisting of $Cu^{II}$, $Zn^{II}$, $Pb^{II}$, $Co^{II}$, $Fe^{II}$, $Hg^{II}$, $Ni^{II}$, $Zn^{II}$, $Sn^{II}$, the surface of the photosensitive member being treated with said treating material and then imagewise exposed by said radiation to form an image.

5. A method of recording which comprises employing a photosensitive member containing mainly an organic halogen compound having at least one halogen atom and an organic metal salt capable of being reduced with a radiation energy selected from the group consisting of metal oxalates, metal acetates, $Cu(OH)_2(CH_3COO)_4$ and metal dithizones, of formula

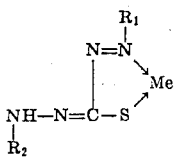

where $R_1$ and $R_2$ are selected from the group consisting of hydrogen, alkyl, aralkyl, and aryl; Me is a metal atom selected from the group consisting of $Cu^{II}$, $Zn^{II}$, $Pb^{II}$, $Co^{II}$, $Fe^{II}$, $Hg^{II}$, $Ni^{II}$, $Zn^{II}$, $Sn^{II}$, and a treating material composed of mainly an image forming material selected from the group consisting of arylamines, indoles, spiropyran compounds and acid-base indicators capable of forming an image by color change caused by the reaction with at least one member of the group consisting of a free radical produced from said organic halogen compound and a halogen acid formed secondarily from said free radical, said photosensitive member being subjected to imagewise exposure and then the surface of the photosensitive member is treated with said treating material.

6. A method of recording which comprises employing a photosensitive member containing mainly an organic halogen compound having at least one halogen atom and an organic metal salt capable of being reduced with a radiation energy selected from the group consisting of metal oxalates, metal acetates, $Cu(OH)_2(CH_3COO)_4$ and metal dithizones, of the formula

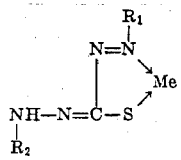

where $R_1$ and $R_2$ are selected from the group consisting of hydrogen, alkyl, aralkyl, and aryl; Me is a metal atom selected from the group consisting of $Cu^{II}$, $Zn^{II}$, $Pb^{II}$, $Co^{II}$, $Fe^{II}$, $Hg^{II}$, $Ni^{II}$, $Zn^{II}$, $Sn^{II}$, and a treating material composed of mainly an image forming material selected from the group consisting of arylamines, indoles, spiropyran compounds and acid-base indicators capable of forming an image by color change caused by a reaction with at least one member of the group consisting of a free radical produced from said organic halogen compound and a halogen acid formed secondarily from said free radical, the surface of said photosensitive member being treated with said treating material and then imagewise exposed by said radiation to form an image.

7. A method of recording which comprises employing a photosensitive member containing mainly an organic metal salt capable of being reduced by a radiation energy selected from the group consisting of metal oxalates, metal acetates, $Cu(OH)_2(CH_3COO)_4$ and metal dithizones of the formula

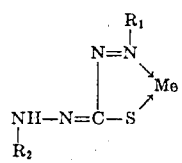

where $R_1$ and $R_2$ are selected from the group consisting of hydrogen, alkyl, aralkyl, and aryl; Me is a metal atom selected from the group consisting of $Cu^{II}$, $Zn^{II}$, $Pb^{II}$, $Co^{II}$, $Fe^{II}$, $Hg^{II}$, $Zn^{II}$, $Sp^{II}$, and an image forming material selected from the group consisting of arylamines, indoles, spiropyran compounds and acid-base indicators capable of forming an image by color change caused by the reaction with at least one member of the group consisting of a free radical produced from an organic halogen compound having at least one halogen atom and a halogen acid secondarily formed from said free radical, and a treating member composed mainly of said organic halogen compound, and applying to at least said image forming material an imagewise radiation capable of reducing said organic metal salt after or before the surface of the photosensitive member is treated with the treating material.

8. A method of recording according to claim 7 in which said photosensitive member is imagewise exposed by said radiation energy and then the surface of the photosensitive member is treated with said treating material to form said image.

9. A method of recording according to claim 7 in which the surface of said photosensitive material is treated with said treating material and then imagewise exposed by said radiation energy to form said image.

10. A method of recording which comprises employing a photosensitive member containing mainly an image forming material selected from the group consisting of arylamines, indoles, spiropyran compounds and acid-base indicators capable of forming an image by color change caused by the reaction of at least one member of the group consisting of a free radical produced from an organic halogen compound having at least one halogen atom and a halogen acid secondarily formed from said free radical, and a treating material composed mainly of said organic halogen compound and an organic metal salt capable of being reduced by a radiation energy selected from the group consisting of meal oxalates, metal acetates, $Cu(OH)_2(CH_3COO)_4$ and metal dithizones of the formula

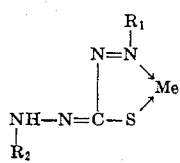

where $R_1$ and $R_2$ are selected from the group consisting of hydrogen, alkyl, aralkyl, and aryl; Me is a metal atom selected from the group consisting of $Cu''$, $Zn''$, $Pb''$, $Co''$, $Fe''$, $Hg''$, $Ni''$, $Zn''$, $Sn''$, and applying to at least said treating material a radiation to form said image, the surface of said photosensitive member being treated with said treated material and then subjected to imagewise exposure by radiation to form an image.

* * * * *

UNITED STATES PATENT OFFICE
CERTIFICATE OF CORRECTION

Patent No. 3,754,914                    Dated August 28, 1973

Inventor(s) Eiichi Inoue and Isamu Shimizu

It is certified that error appears in the above-identified patent and that said Letters Patent are hereby corrected as shown below:

Column 4 line 5 change "$Me^{++}$" to -- $Me^+$ --

Column 4 line 18 change "compunds" to -- compounds --

Column 4 line 51 change "compund" to -- compound --

Column 11 line 10 after "surface" insert -- layer --

Column 13 line 29 change "memory" to -- mercury --

Column 13 lines 35-36 change "negative" to -- positive --

Column 13 lines 45 and 55 change "melt" to -- metal --

Column 14 line 4 change "palte" to -- plate --

Column 14 line 61 before "paper" insert -- art --

Signed and sealed this 17th day of September 1974.

(SEAL)
Attest:

McCOY M. GIBSON JR.
Attesting Officer

C. MARSHALL DANN
Commissioner of Patents